United States Patent [19]

Nidola et al.

[11] Patent Number: 4,834,851

[45] Date of Patent: May 30, 1989

[54] PERMANENT ANODE

[75] Inventors: Antonio Nidola; Renato Schira; Oronzio de Nora, all of Milan, Italy

[73] Assignee: S.E.R.E. S.r.l., Milan, Italy

[21] Appl. No.: 82,807

[22] Filed: Aug. 6, 1987

[30] Foreign Application Priority Data

Oct. 22, 1986 [IT] Italy .................... 22078 A/86

[51] Int. Cl.$^4$ .................................... C25C 1/18
[52] U.S. Cl. .................... 204/114; 204/290 R; 204/290 F
[58] Field of Search .......... 204/114, 117, 242, 290 R, 204/290 F

[56] References Cited

U.S. PATENT DOCUMENTS

| | | | |
|---|---|---|---|
| 3,985,630 | 10/1976 | Ginatta | 204/114 |
| 4,230,545 | 10/1980 | Prengaman et al. | 204/114 |
| 4,272,340 | 6/1981 | Cole, Jr. et al. | 204/57 |
| 4,626,334 | 12/1986 | Ohe et al. | 204/290 R |

FOREIGN PATENT DOCUMENTS 0047911 11/1979 European Pat. Off. ........ 204/290 R

Primary Examiner—John F. Niebling
Assistant Examiner—Kathryn Gorgos
Attorney, Agent, or Firm—Bierman and Muserlian

[57] ABSTRACT

An anode comprising an electroconductive substrate, whose external surface at least is selected from the group consisting of vanadium, niobium, tantalum and tungsten, alloys of said metals with each other and alloys of said metals with at least one metal selected from the group consisting of metals of groups IIIB and IV of the Periodic Table, lanthanides, actinides, the external surface having a corrosion resistant electrocatalytic coating of at least one member of the group consisting of noble metals and alloys thereof, noble metal oxides and non-noble metal oxides, characterized in that the coating also contains at least one compound of an element selected from the group consisting of arsenic, antimony, bismuth, tin, for metal recovery from acid solutions based on fluodide-containing complex anions and an electrochemical cell.

8 Claims, No Drawings

PERMANENT ANODE

STATE OF THE ART

Lead recovery form spent storage batteries has been accomplished so far by pyrometallurgical processes, although also hydrometallurgical processes which never passed the experimental phase are known which comprise final recovery of the metal by means of an electrolysis process. The pyrometallurgical process is carried out in revolving ovens, in the presence of $SiO_2$ as a desulfatizing agent and $CaO$ as a desilicating agent, under carbon oxide (CO) reducing atmosphere, according to the following reaction:

(1) Desulfatizing $$PbSO_4 + SiO_2 \rightarrow PbSiO_3 + SO_2 + \tfrac{1}{2}O_2$$

(2) Desilicating $$PbSiO_3 + CaO + CO \rightarrow Pb + CaSiO_3 + CO_2$$

However, the pyrometallurgical process involves serious environmental problems as toxic gases (CO, $SO_2$) are utilized and produces emissions containing lead droplets and particles which are dispersed in the atmosphere. For this reason, in some of the most important industrial countries interested in the field such as United States, Canada, Japan and Great Britain, new more restrictive environmental regulations entered into force, particularly with regards to the lead particle content in a cubic meter of air, either on the plant site or in the surrounding area. It is therefore to be expected that all of the remaining industrial countries will adopt similar regulations.

As a consequence, the hydrometallurgical process results are favored. In fact only by this system is it possible to meet the requirements imposed by the more retrictive environmental regulations. Three types of hydrometallurgical processes are known for recovering lead from scrap batteries. The first type of hydrometallurgical process, the so-called DIRECT process, is based on a spontaneous reaction of bivalent lead formation, simply activated by short-circuiting the battery poles in acid electrolyte (e.g. fluoroboric acid). Lead thus passes into solution and is deposited onto suitable cathodes. The batteries are not crushed as in the other hydrometallurgical processes but just the bottom is cut off. After the cutting step, the batteries are placed upside down onto frames which constitute the cathodic current collectors of the above mentioned electrolytic cells. However, the direct process is not completely efficient for all of the treated batteries or at least for not all of the grids of said batteries.

Another type of electrolytic process, the so-called BASIC process, consists in completely dissolving in a strongly basic media (200 g/l NaOH) the lead fine fraction obtained by grinding the batteries after the organic compounds (polyethylene, PVC) have been separated therefrom. Lead is solubilized as complex anions and the basic solution is then subjected to electrolysis with lead ions being deposited onto the cathode in powder form and separated by centrifugation, washed, melted and cast in ingots. Oxygen is evolved at the anode. Nickel anodes are conventionally used. Spent electrolyte is recycled. A disadvantage of the above process is represented by the complex design of the electrolytic cell which requires a diaphragm to separate the anolyte from the catholyte wherein the metal is dispersed in the form of black powder.

In regard to the third type of electrochemical process, the so-called ACID process, two alternatives are known (see Italian patent application No. 67723 A/82 and U.S. Pat. No. 4,230,545; No. 4,272,340 and No. 4,135,997). A first alternative utilizes fluorosilicic acid for treating the sludge which is previously desulfatized by ammonium carbonate:

$$PbSO_4 + (NH_4)_2CO_3 = PbCO_3 + (NH_4)_2SO_4$$

to obtain a solution of lead fluorosilicate. The possibility of obtaining a lead acid solution is particularly advantageous as it permits one to proceed subsequently to the electrocatalytic deposition of the metal of considerable thickness and high quality, and obtain thus a product similar to electrolytically refined lead.

According to an alternative, the fine fraction obtained by grinding is treated with a highly concentrated NaOH solution, wherein the NaOH quantity is below the required value. An oxide, minium, is easily separated and readily subjected to the attack by acid solutions, e.g. fluoroboric acid (see, for example, U.S. Pat. No. 4,460,442).

However, insoluble anodes suitable for oxygen evolution from electrolytic acid solution are not available on the market. Various attempts have been carried out utilizing carbon or graphite anodes (see U.S. Pat. No. 4,460,442), also coated by lead dioxide in fluoorosilicic electrolytes but their active life-time is limited to a few days. Similar results are obtained by utilizing fluoroboric electrolytes.

Titanium anodes coated by lead dioxide give better results, but, the metal substrate may undergo electrolyte attack even if partially protected by the $PbO_2$ coating. This unavoidably affects the anode life-time which is still industrially unacceptable, not exceeding 1000 hours of operation. Furthermore, a parasitic electrolytic reaction takes place at the anode which involves deposition of lead dioxide. However, by adding suitable additives to the electrolyte, e.g. $H_3PO_4$, $H_3AsO_4$, $H_3SbO_4$, $H_3BO_3$ the parasitic reaction may be inhibited and oxygen evolution may be thus favored. For example, U.S. Pat. No. 4,272,340 teaches that 2.3 to 9.5 g/l of $H_3PO_4$ inhibit the deposition of $PbO_2$. In a similar way, U.S. Pat. No. 3,985,630 teaches the addition of 0.2 to 1 g/l of antimony compounds to the bath and U.S. Pat. No. 4,230,545 teaches the addition of more than 0.25 g/l of arsenic compounds. However, in the presence of such additives, at the concentration range known in the art, cracking, pulverizing and/or detachment of the lead deposit take place and cause re-dissolution of the removed metal which is highly reactive, sedimentation and mud formation with consequent reduction of the overall current efficiency of the process.

OBJECTS OF THE INVENTION

It is an object of the invention to overcome the disadvantages of conventional ACID processes by providing an anode having a life-time of industrial interest (some thousands of hours) suitable for operating also under high current densities, for example 5 to 20 times higher than the conventional ones.

It is another object of the invention to provide an anode which favors oxygen evolution under relatively low overvoltages, with respect to $PbO_2$ formation, wherein reduced quantities of additives in the electrolyte are required for inhibiting the PbO$_2$ anodic deposition, within such values as to not affect the quality of lead deposited onto the cathode and the corresponding cathodic deposition efficiency.

It is a further object of the invention to provide an electrochemical process for recovering metals such as molybdenum, tungsten, copper and, in particular, lead, from fluorocomplex acid solutions which process is carried out in a cell with an anode of the invention and is characterized in that the quantity of inhibitors to be added to the electrolyte is considerably reduced compared with the prior art technique.

These and other objects and advantages of the invention will become obvious from the following detailed description.

THE INVENTION

The novel anodes of the invention are comprised of an electroconductive substrate whose external surface at least is selected from the group consisting of vanadium, niobium, tantalum and tungsten and alloys of said metals with each other and alloys of the said metals with at least one metal selected from the group consisting of metals of groups III$_B$ and IV of the Periodic Table, lanthanides and actinides, the external surface having a corrosion-resistant, electrocatalytic coating of at least one member of the group consisting of noble metals and alloys thereof, noble metal oxides and non-noble metal oxides, characterized in that the coating also contains at least one compound of an element selected from the group consisting of arsenic, antimony, bismuth, tin and mixtures thereof. The anodes are resistant to the electrolyte attack and have therefore a substantially unlimited life-time (permanent anode).

By fluorocomplex acid solution, it is intended a solution containing complex anions of fluorine capable of solubilizing metals. Typical examples of said complex anions are H$_2$SiF$_6$, HBF$_4$ and HBeF$_3$.

When lead is to be recovered, the electrocatalytic coating is constituted by noble metals or oxides of noble metals and non-noble metals and further comprises an inhibiting agent for the parasite reaction of anodic deposition of PbO$_2$, which agent is selected from the group comprising arsenic, antimony, bismuth and tin. This permits one to utilize a minimum quantity of known inhibitors for the said parasitic reaction, dissolved in the electrolyte, within such values as to guarantee a high quality of the cathodically deposited lead.

As is well known, the said metals constituting the substrate of the anode besides being very expensive are not good electrical conductors. As a consequence, when operating under high current densities, ohmic losses and uneven current distribution may be experienced with the obvious inconveniences deriving therefrom. To avoid these disadvantages, the electroconductive substrate core is constituted by a metal exhibiting an efficient electrical conductivity, higher than the more external portion of the substrate. Preferred metals for the substrate core are copper, aluminum or silver whereby an anode is obtained which efficiently operates under high current densities.

The electrocatalytic coating of the anode of the present invention may be constituted by a metal or alloys of metals compatible with the anodic environment such as for example platinum or rhodium, or oxides or mixed oxides of said metals insoluble in the electrolyte, such as for example PbO$_2$ or IrO$_2$, or a combination of said oxides with said metals.

It is evident for those skilled in the art that the anode of the invention is suitable for use also for recovering metals other than lead such as, for example, cadmium and tungsten, from fluorocomplex acid solutions.

According to a further embodiment of the invention, the electrochemical processes for recovering metallic lead from fluorocomplex acid solutions is carried out in a electrolysis cell having an anode of the above described type, wherein the known inhibitors for the parasitic reaction of PbO$_2$ anodic deposition are added to the electrolyte in substantially lower amounts than the prior art, that is lower than 2 g/l in the case of H$_3$PO$_4$ under a current density up to 5000 A/m$^2$. A process is thus obtained wherein a lower quantity of inhibiting agents is required compared with the state of the art processes, and the undesired side-effects on the quality of the product are avoided.

The mentioned reduction of the concentrations of inhibitors is accomplished by incorporating into the electrocatalytic coating an additive for inhibiting the PbO$_2$ anodic deposition which additive is selected between arsenic, antimony, bismuth and tin. Electrocatalytic coating containing said additives are for example: Pt.SbO$_x$.nH$_2$O; IrO$_2$.TaO$_2$.As$_2$O$_3$; PbO$_2$.IrO$_2$.Sb$_2$O$_3$; PbO$_2$.SbO$_x$.nH$_2$O.

According to a further embodiment of the invention, the electrochemical process for recovering lead from fluorocomplex acid solutions is carried out in an electrolysis cell having an anode whose electrocatalytic coating comprises the aforementioned inhibitors and is characterized in that the quantity of inhibitor added to the electrolyte is considerably below the threshold of conventional prior art processes, avoiding thus the undesired side-effects on the quality of the lead product.

The additive contained in the electrocatalytic coating as a solid phase, and the inhibitors dissolved in the electrolyte as a liquid phase, give thus rise to a heterogeneous synergistic action.

The electrocatalytic coating containing the aforementioned additive of the invention may be obtained for example through one of the following techniques:

(I) Galvanic method (a) by cathodically depositing platinum onto niobium from commercial baths in the presence of antimony soluble salts.

(b) by anodically depositing onto tantalum, lead dioxide pigmented with iridium dioxide (IrO$_2$) by means of lead salt solutions (nitrate, acetate, perchlorate, etc.) at a controlled pH wherein micronized iridium dioxide powder containing defined quantities of antimony (arsenic and/or tin) is held in suspension;

(II) Thermal method

By chemical, simultaneous deposition of tantalum oxide, iridium dioxide and/or antimony oxides starting from solutions of the corresponding chlorides or equivalent compounds added with hydrochloric acid.

In the following examples there are described several preferred embodiments to illustrate the invention. However, it is to be understood that the invention is not intended to be limited to the specific embodiments.

EXAMPLE 1

Two graphite samples measuring 35×35×10 mm and two tantalum samples, two tungsten samples, two niobium samples and six titanium and titanium alloys samples, all of them having dimensions of 35×35×1 mm were coated, after sand-blasting (except for the two graphite samples) by β type lead dioxide. The coating was applied by galvanic deposition from an acid lead nitrate bath at 70° C. and a current density of 100 A/m² for 150 minutes to obtain a coating thickness of about 200 microns. The samples were utilized an anodes in an electrolysis cell with two types of acid electrolyte suitable for lead deposition, which represent the state of the art prior to the present invention.

| Electrolyte (A) | $Pb++$ free $HBF_4$ $H_3PO_4$ | 50 g/l 125 g/l 3 g/l | Electrolyte (B) | $Pb++$ free $H_2SiF_6$ $H_3PO_4$ | 70 g/l 90 g/l 3 g/l |
|---|---|---|---|---|---| at a temperature of 30° C., a current density of 500 A/m² and utilizing lead cathodes. The experimental results thus obtained, comprising cell voltage and faraday efficiency for the undesired lead dioxide anodic deposition as a function of time, as well as the type of electrolyte utilized, are reported in Table I.

TABLE 1

| Electrode description | Electrolyte | Cell Voltage (Volts) 1 day | 20 days | 40 days | Faraday Efficiency (%) $Pb++ \rightarrow PbO_2$ 1 day | 20 days | 40 days | Remarks |
|---|---|---|---|---|---|---|---|---|
| graphite + beta-$PbO_2$ | $HBF_4$ | 2.65 | — | — | 2.6 | — | — | Coating detachment |
| | $H_2SiF_6$ | 2.70 | — | — | 7.5 | — | — | |
| Ti + beta-$PbO_2$ | $HBF_4$ | 2.64 | 2.65 | — | 0.4 | 1.2 | — | Coating detachment due to corrosion |
| | $H_2SiF_6$ | 2.68 | 2.70 | — | 2.6 | 3.5 | — | |
| Ta + beta-$PbO_2$ | $HBF_4$ | 2.66 | 2.66 | 2.67 | 0.2 | 0.3 | 0.2 | |
| | $H_2SiF_6$ | 2.71 | 2.70 | 2.71 | 1.5 | 0.7 | 0.9 | |
| W + beta-$PbO_2$ | $HBF_4$ | 2.66 | 2.66 | 2.65 | 0.5 | 0.3 | 0.3 | |
| | $H_2SiF_6$ | 2.72 | 2.72 | 2.72 | 0.8 | 0.7 | 0.7 | |
| Ti—Ta (5%) + beta-$PbO_2$ | $HBF_4$ | 2.65 | 2.65 | 2.65 | 0.2 | 0.2 | 0.2 | |
| | $H_2SiF_6$ | 2.69 | 2.71 | 2.70 | 1.5 | 1.4 | 1.4 | |
| Ti—Nb (1.5%) + beta-$PbO_2$ | $HBF_4$ | 2.64 | 2.64 | 2.68 | 0.6 | 0.8 | 0.4 | |
| | $H_2SiF_6$ | 2.70 | 2.70 | 2.70 | 0.9 | 1.5 | 1.5 | |
| Nb + beta-$PbO_2$ | $HBF_4$ | 2.63 | 2.63 | 2.63 | 0.9 | 0.5 | 0.5 | |
| | $HBF_4$ | 2.22 | 2.22 | 2.22 | 84 | 85 | 88 | electrolyte free of $H_3PO_4$ |

EXAMPLE 2

Ten tantalum samples measuring 35×35×1 mm, after sand-blasting, were coated with different electrocatalytic layers for the oxygen evolution reaction with various controlled thicknesses containing inhibitors of the undesired lead dioxide anodic deposition, applied by known techniques such as the galvanic or thermal deposition described in Table 2.1. The samples were treated as anodes in an electrolysis cell utilizing an electrolyte having the following composition:

$Pb++$, 150 g/l
free $HBF_4$, 125 g/l
$H_3PO_4$, 400 ppm at a current density of 500 A/m² and utilizing lead cathodes. The experimental results thus obtained, comprising cell voltage and faraday efficiency for the undesired lead dioxide anodic deposition as a functional of time, as well as the electrolyte temperature, are reported in Table 2.2.

TABLE 2.1

| Sample No. | Type of coating | Coating load | Method of Deposition |
|---|---|---|---|
| 1 | Pt.SbOx.n$H_2O$ (9.5:0.5 by weight as metals) | 30 g/m² (Pt) | galvanic, from commercial acid bath with addition of $SbCl_3$. (70° C.; 100 A/m²) |
| 2 | Pt.Ir.$Sb_2O_3$ (6.8:2.7:0.5 by weight as metals) | 10 g/m² (total noble metals) | sraying of hydroalcoholic solution of $H_2PtCl_6$, $IrCl_3$ e $SbCl_5$ in proper ratio, subsequent thermal decomposition at 500° C. for 10″ in oven under forced air ventilation as many cycles as required to reach the expected noble metals load. |
| 3 | $TaO_2$.$IrO_2$.$Bi_2O_3$ (3:6:1) by weight as metals) | 10 g/m² (Ir) | spraying of hydroalcoholic solution of $IrCl_3$, $TaCl_5$ e $Bi(NO_3)_3$, in proper ratio, subsequent thermal decomposition at 500° C. for 10″in oven under forced air ventilation as many cycles as required to reach the expected Ir load. |
| 4 | $TaO_2$.$IrO_2$.$As_2O_3$ (3:6.5:0.5 by weight as metals) | 10 g/m² (Ir) | spraying of hydroalcoholic solution of $IrCl_3$, $TaCl_5$ and $AsCl_3$, in proper ratio, subsequent thermal decomposition at 500° C. for 10″ in oven under forced air ventilation as many cycles as required to reach the expected Ir load. |
| 5 | alfa-$PbO_2$.$RuO_2$.$SnO_2$ | 200 micron | galvanic, from lead perchlorate bath |

TABLE 2.1-continued

| Sample No. | Type of coating | Coating load | Method of Deposition |
|---|---|---|---|
| | (Ru 9:1 Sn by weight as metals) | (coating thickness) | containing, under suspension, powder of ruthenium dioxide, doped by tin dioxide, in a ratio of 1 g/l (pH = 4; 50° C.; 100 A/m$^2$) |
| 6 | beta-PbO$_2$ | 200 micron (coating thickness) | galvanic, from lead nitrate bath (70° C., 100 A/m$^2$). |
| 7–10 | beta-PbO$_2$.Sb$_2$O$_3$ | 200 micron (coating thickness) | galvanic, from lead nitrate bath containing, under suspension, powder of Sb$_2$O$_3$ in a ratio of 2 g/l (70° C., 100 A/m$^2$). |

TABLE 2.2

| Sample No. | Catalyst description | cell voltage (Volts) 1 day | 20 days | 40 days | faraday efficiency (%) Pb++ → PbO$_2$ 1 day | 20 days | 40 days | Remarks |
|---|---|---|---|---|---|---|---|---|
| 1 | Pt.SbOx.nH$_2$O | 2.66 | 2.66 | 2.65 | 0.5 | 0.2 | 0.3 | |
| 2 | Pt.Ir.Sb$_2$O$_3$ | 2.41 | 2.41 | 2.41 | 0.0 | 0.2 | 0.1 | |
| 3 | TaO$_2$.IrO$_2$.Bi$_2$O$_3$ | 2.31 | 2.32 | 2.32 | 0.1 | 0.0 | 0.2 | |
| 4 | TaO$_2$.IrO$_2$.As$_2$O$_3$ | 2.34 | 2.35 | 2.35 | 0.3 | 0.5 | 0.5 | |
| 5 | alfa-PbO$_2$.RuO$_2$.SnO$_2$ | 2.47 | 2.47 | 2.49 | 0.3 | 0.5 | 0.5 | |
| 6 | beta-PbO$_2$ | 2.68 | 2.64 | 2.63 | 27 | 31 | 43 | |
| 7 | beta-PbO$_2$.Sb$_2$O$_3$ | 2.70 | 2.65 | 2.65 | 22 | 30 | 34 | electrolyte free from H$_3$PO$_4$. |
| | | | | | | | | anodic current density |
| 8 | beta-PbO$_2$.Sb$_2$O$_3$ | 2.73 | 2.72 | 2.72 | 0.9 | 1.1 | 1.1 | 0.7 kA/m$^2$ |
| 9 | beta-PbO$_2$.Sb$_2$O$_3$ | 2.86 | 2.84 | 2.84 | 0.9 | 0.9 | 0.9 | 1.5 kA/m$^2$ |
| 10 | beta-PbO$_2$.Sb$_2$O$_3$ | 3.10 | 3.12 | 3.15 | 0.7 | 0.8 | 0.8 | 3 kA/m$^2$ |

Various modifications of the anodes and electrolytic cells and the process of the invention may be made without departing from the spirit or scope thereof and it should be understood that the invention is intended to be limited only as defined in the appended claims.

What we claim is:

1. In a process for the electrolytic recovery of lead carried out in a cell fed with an acid solution containing lead ions, fluoride complex anions and an inhibitor to prevent the parasitic reaction of lead dioxide formation at the anode, said cell equipped with an anode comprising an electroconductive substrate, an intermediate layer of a corrosion resistant metal and an external, electrocatalytic coating comprising at least one member of the group of noble metals and alloys thereof and metal oxides, and at least one compound of an element selected from the group of arsenic, antimony, bismuth and tin, the improvement comprising that the amount of said inhibitor in the acid solution is less than amounts that interfere with the cathodic lead deposit.

2. The process of claim 1 wherein the electrocatalytic coating is selected from the group consisting of Pt.SbOx.nH2O; IrO2.TaO2.As2O3; PbO2.IrO2.Sb2O3 and PbO2.SbOx.nH2O.

3. The process of claim 1 wherein the inhibitor in the acid solution is H3PO4 in amounts less than 2000 ppm.

4. The process of claim 1 wherein the inhibitor in the acid solution is arsenic in amounts less than 250 ppm.

5. The process of claim 1 wherein the inhibitor in the acid solution is antimony in amounts less than 200 ppm.

6. The process of claim 1 wherein the intermediate layer is tantalum or niobium.

7. The process of claim 1 wherein the electroconductive substrate is made of a member selected from the group consisting of copper, aluminum and silver.

8. The process of claim 1 wherein the electrocatalytic coating is selected from the group consisting of platinum, rhodium, oxides and mixed oxides of platinum or rhodium, PbO$_2$ and IrO$_2$.

* * * * *